US009930314B2

(12) United States Patent
Pimenov et al.

(10) Patent No.: US 9,930,314 B2
(45) Date of Patent: Mar. 27, 2018

(54) STEREO-APPROACH DISTANCE AND SPEED METER

(71) Applicant: Computer Vision Systems LLC, St. Petersburg (RU)

(72) Inventors: Alexandr A. Pimenov, St. Petersburg (RU); Vladimir V. Ufnarovsky, St. Petersburg (RU); Timofey A. Bryksin, St. Petersburg (RU); Andrey N. Terekhov, St. Petersburg (RU)

(73) Assignee: Computer Vision Systems LLC, St. Petersburg (RU)

(*) Notice: Subject to any disclaimer, the term of this patent is extended or adjusted under 35 U.S.C. 154(b) by 324 days.

(21) Appl. No.: 14/584,276

(22) Filed: Dec. 29, 2014

(65) Prior Publication Data

US 2015/0109421 A1    Apr. 23, 2015

Related U.S. Application Data

(63) Continuation of application No. PCT/RU2012/000753, filed on Sep. 5, 2012.

(30) Foreign Application Priority Data

Jun. 29, 2012 (RU) .................................. 2012128904

(51) Int. Cl.
*H04N 13/02* (2006.01)
*G01C 3/14* (2006.01)
(Continued)

(52) U.S. Cl.
CPC ........... *H04N 13/0239* (2013.01); *G01C 3/14* (2013.01); *G01C 11/12* (2013.01); *G06T 7/292* (2017.01);
(Continued)

(58) Field of Classification Search
CPC . G01C 11/12; G01C 3/14; G06T 2207/30252; G06T 7/0075;
(Continued)

(56) References Cited

U.S. PATENT DOCUMENTS 7,106,365 B1 * 9/2006 Sogawa .................... B60R 1/00
                                                             348/148
8,164,629 B1 * 4/2012 Zhang ....................... G06T 7/20
                                                             348/142
(Continued)

FOREIGN PATENT DOCUMENTS

RU          2092869 C1    10/1997
RU            96951 U1     8/2010
(Continued)

*Primary Examiner* — Sath V Perungavoor
*Assistant Examiner* — Peet Dhillon
(74) *Attorney, Agent, or Firm* — Arent Fox LLP; Michael Fainberg

(57) ABSTRACT

Disclosed a stereo-approach distance and speed meter system comprising: video camera module consisting of at least two video cameras focused on the analyzed object primary interface module for video camera module interface conversion into data for processing; primary image normalization and rectification module; updating data container module; attribute extraction module; attribute ranking module; primary attribute reorganization module; primary frame matching module; primary hypothesis generation module; primary hypothesis filter module; attribute post-organization module; secondary attribute matching module; secondary hypothesis generation module; secondary filter module; buffer improvement module, stereo refinement module; sequence refinement module; triangulation module; secondary rectification module; previous frame data and attribute container module; secondary interface module.

19 Claims, 1 Drawing Sheet

(51) Int. Cl.
  *G01C 11/12* (2006.01)
  *G06T 7/593* (2017.01)
  *G06T 7/292* (2017.01)

(52) U.S. Cl.
  CPC .... *G06T 7/593* (2017.01); *G06T 2207/10012* (2013.01); *G06T 2207/10021* (2013.01); *G06T 2207/10028* (2013.01); *G06T 2207/30252* (2013.01)

(58) Field of Classification Search
  CPC . G06T 2207/10028; G06T 2207/10012; G06T 2207/10021; G06T 7/2093; H04N 13/0239
  USPC .......................................................... 382/305
  See application file for complete search history.

(56) References Cited

U.S. PATENT DOCUMENTS

| | | | | |
|---|---|---|---|---|
| 2002/0012459 A1* | 1/2002 | Oh | ............ | G06K 9/32 382/154 |
| 2005/0111705 A1* | 5/2005 | Waupotitsch | ...... | G06K 9/00255 382/118 |
| 2008/0273751 A1* | 11/2008 | Yuan | ........................ | G06K 9/32 382/103 |
| 2009/0060280 A1* | 3/2009 | Choi | ....................... | G06T 7/593 382/106 |
| 2009/0225845 A1* | 9/2009 | Veremeev | ............. | H04N 5/145 375/240.16 |
| 2013/0148849 A1* | 6/2013 | Nakai | ................. | G06K 9/00664 382/103 |
| 2013/0259381 A1* | 10/2013 | Srinivasan | .......... | G06K 9/00221 382/192 |

FOREIGN PATENT DOCUMENTS

| | | |
|---|---|---|
| RU | 112118 U1 | 1/2012 |
| RU | 113398 U1 | 2/2012 |
| RU | 2449375 C | 4/2012 |
| RU | 2452033 C2 | 5/2012 |

* cited by examiner

STEREO-APPROACH DISTANCE AND SPEED METER

CROSS-REFERENCE TO RELATED APPLICATIONS

This application is a continuation of International Application No. PCT/RU2012/000753 filed Sep. 5, 2012, which claims benefit of priority to Russian Application No. 2012128904 filed on Jun. 29, 2012, both of which are incorporated by reference herein.

TECHNICAL FIELD

This invention falls under computer category, specifically machine (computed) image vision and analysis, and can be applied for measuring distance from and speed of various objects in such industries as transport, construction, mechanical engineering etc.

BACKGROUND

Currently many efficient object recognition technologies are available which are based on use of data on object element image distance (hereinafter—z-buffer) from a specific sensor.

The most popular z-buffering devices are radars, including laser type, and various sensors. Examples of these systems are described in Russian Patent No. 2092869 "Motor vehicle traffic safety radar", Russian Patent No. 113398 "Motor vehicle speed and coordinate system", Russian Patent No. 112118 "Pedestrian protection from collision with a vehicle", Russian Patent No. 96951 "Radar-Navigator system", Russian Patent No. 2452033 "Night vision systems and methods", Russian Patent No. 2449375 "Motor vehicle preview capacity detector".

All of the above systems are used in active technologies, i.e. requiring mandatory exposure of the analyzed object to illumination. The major drawbacks of such technical solutions include: background light sensitivity (bright sun etc.)—functionality reduces depending on flash intensity; sensitivity to operation of a similar system nearby (interference)—the system detects flashing from such other system and reduces its own functionality.

Stereo-based z-buffering is another method of object recognition. In this case z-buffer is built on the basis of two or more synchronized object images. Z-buffer allows object stratification by depth yet autonomously it is incapable of predicting their motion, since it requires object speed data, which can be computed with the aid of optical image sequence processing.

The most congenial technical solution, or prototype, is represented by the approach described in the article "Dense, Robust, and Accurate Motion Field Estimation from Stereo Images sequences in Real-time" by Rabe et al. This system allows object motion estimation on the basis of data transmitted from camera stereo. The system is composed of the following modules: cameras (a), image decoder (b), rectifier (c), disparity computer (object image interval in the first and second images of the rectified stereo) (d), image point motion computer (e), noise reducer (f), controller (g). This approach was developed into video adapter software integration.

The limitations of this system consists in the fact that object detection and distance estimation are based on comparison of all shots and its inability to provide comparison of all the shots, high computation requirements and incompatibility with only video adapter based PLO on-line integration. Not all of the algorithms used are capable of providing a high paralleling capacity, which results in limited system acceleration and complicating the development of a compact on-line device.

SUMMARY

The objective of this invention consists in the development of a compact object distance and speed meter based on stereo-approach and resolving the limitations of these technical solutions, specifically system on-line operation ability due to application of improved algorithms and development of alternative approaches in system modules as well as improving the accuracy of object distance and speed measurement through faster data processing and higher tolerance to changes in lighting environment during operation in passive mode. Higher tolerance to lighting environment compared to the active systems dominating in the market is achieved through passive operation (no illumination of the analyzed object is required) and use of cameras with improved classic CMOS and CCD sensors.

The technical result consists in improvement of system efficiency through faster object distance and speed measurement based on stereo approach. Such technical result is achieved with the aid of the proposed system for stereo measurement of object distance and speed (hereinafter—System) composed of a video camera module consisting of at least two video cameras focused on the analyzed object (1); primary interface module for video camera module (1) interface conversion into data for processing (2); primary image normalization and rectification module (3); updating data container module (4); attribute extraction module (5); attribute ranking module (6); primary attribute reorganization module (7); primary frame matching module (8); primary hypothesis generation module (9); primary hypothesis filter module (10); attribute postorganization module (11); secondary attribute matching module (12); secondary hypothesis generation module (13); secondary filter module (14); buffer improvement module (15), stereo refinement module (16); sequence refinement module (17); triangulation module (object distance estimation by disparity, fundamental matrix and stereo base) (18); secondary rectification module (19); previous frame data and attribute container module (20); secondary interface module (21).

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
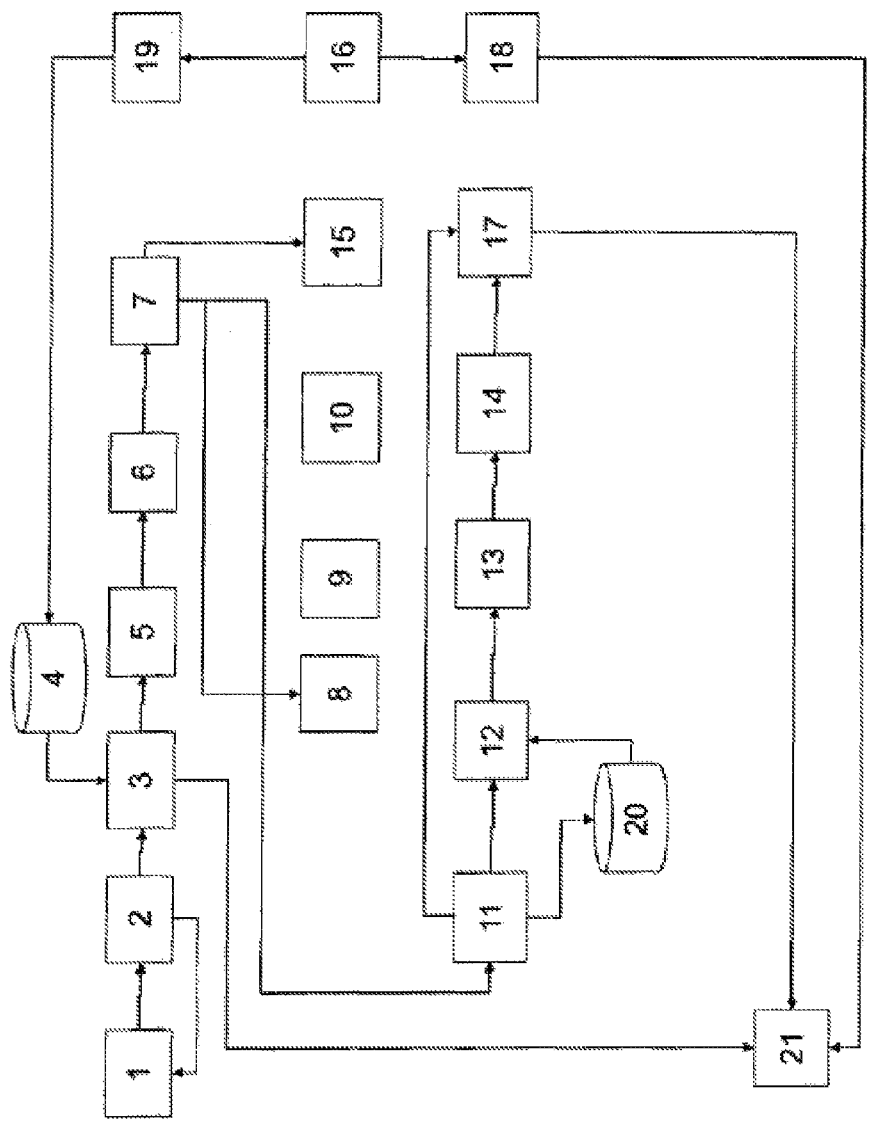
FIG. 1 illustrates a block diagram of an example system for measuring distance from and speed of an object according to one aspect of the invention.

Example aspects are described herein in the context of a system and method for measuring distance to and speed of objects. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

FIG. 1 illustrates a block diagram of an example system for measuring distance from and speed of an object according to one aspect of the invention. The system includes the following modules: module 1 transmits data from the video camera pair in camera output format to module 2 and receives from module 2 updated settings and camera synchronization signals; module 3 receives from module 2 video camera pair data converted into internal format; module 4 receives from module 3 computed translation vectors for rectification and stores them in ram; module 5 receives from module 3 camera data converted into the internal format; module 6 receives from module 5 an attribute set and transmits to module 5 parity-check data; module 7 receives from module 6 a ranked attribute set in binary format; module 8 receives data (frames) from module 2 and attribute tables from module 7; module 9 receives from module 8 a matched string pair from the left and right frames; module 10 receives hypotheses from module 9; module 11 retrieves attribute tables from module 7; module 12 extracts combined attribute tables from module 11 and frames from module 2 (current frame) and module 20 (previous frame); module 13 receives from module 12 matched positions in the left and right frames; module 14 receives hypotheses from module 13; module 15 receives from module 14 filtered hypotheses; module 16 extracts from module 15 image point data with adjacent point disparity; module 17 extracts from module 15 image point data with adjacent point disparity; module 18 extracts from module 15 image point data with adjacent point disparity; module 19 extracts from module 15 image point data with adjacent point disparity; module 20 receives from module 11 combined attribute tables; and module 21 receives from module 3 the result of optical system distortion compensation and rectification data and meta data (time marks, sensor settings, frame statistics).

An example method of operation of the system of FIG. 1 is disclosed next. The video camera module 1 reproduces bi-dimensional images of the analyzed object. The primary interface module 2 converts interface module 1 conversion into data structures adapted for processing and transmits synchronization signals to cameras if the latter support this function. Module 3 providing optical system divergence normalization, compensation and rectification receives stereo image input and transmits rectified image as output. Updating data container module 4 stores data on spherical distortions and epipolar limitations. Attribute extraction module 5 processes individual pixel peripheries computing for each periphery one or several attribute vectors since the attribute set content or each individual attribute may be defined either by the parameters entered by the operator or by the parameters computed adaptively on the basis of statistic data. Attribute ranking module 6 ranks the attributes into three groups—primary, secondary and irrelevant—based on the statistic data on the current and previous frame attributes. Binarized attribute vectors are transmitted to the primary attribute reorganization module 7. The primary attribute reorganization module 7 input data includes ranked attribute vectors and coordinates of the respective attribute source points. Sequenced image string set data is processed separately and organized by this module into table based on the primary attributes. Each of these tables is re-arranged on the basis of secondary attributes. The primary matching module 8 retrieves data on the sequential strings of the left frame and sequential strings of the right frame and, upon selection of the table corresponding to the same set of primary attributes, performs secondary attribute matching based on effective metrics (discrete, hamming distance, 1_1, 1_inf etc.) and a specific limit value. The module transmits the matched pair to the primary hypothesis generation module 9 where the attribute vectors are omitted only the coordinate pairs are stored. The primary filter module 10 removes the pseudo positive matches and adjusts the erroneous matches by analyzing the hypotheses, application of voting patterns and analyses of lower resolution images and previous frame data. Post-organization module 11 retrieves the data from module 7 and combines the tables for all sequential string sets corresponding to the same primary attribute set into a single table. One copy of the output is transmitted to the secondary matching module 12, and the other copy is stored in the secondary interface module 21 database for use in the following frame. The secondary matching module is similar to module 8, yet instead of data on sequential strings of the right and left frames it processes the current and previous frame data. The secondary hypothesis generation module 13 is functionally similar to module 9, yet its input consists of sequence hypotheses instead of disparity (distance between object image in the first and second frames of the rectified stereo pair). The secondary filter module is similar to module 10. Buffer improvement module 15 uses the filtered (selected) hypotheses to assign disparity to adjacent points. Stereo refinement module 16 uses the improvement module output for sub-pixel (related to measurements of higher than single-pixel image accuracy) refinement of disparity value based on KLT or similar sub-pixel tracking method. Sequence refinement module 17 uses improvement module 15 output for sub-pixel refinement of the optical sequence vectors based on KLT or similar sub-pixel tracking method (object and typical image point tracking during frame changeover or switching from the right to the left frame). Triangulation module 18 converts disparity to buffer depth (i.e. recognized object point data). The secondary rectification module 19 uses disparity range builds the essential and fundamental matrices of the stereo pair on the background of primary range sequence operation and updates the rectification database. The secondary previous frame data and attribute container module 20 contains data on the attributes related to the previous frame points. The secondary interface module 21 transmits the depth and string buffer output for further processing and produces settings for all the modules.

Thus, the processed data flow in the system is linear to a great extent, which allows streamlining most computations, which considerably accelerates data processing and increases system performance, thus allowing to achieve the technical result.

The proposed system can be realized in various ways, both on general purpose processors, such as x86, and ARM, on dedicated mass-parallel processors, specifically supporting OpenCL, and on the special processor designed by us (available either as a separate microcircuit or as software core supporting integration into other processors). Data source may be based on optical and IR cameras in various price and quality segments, from popular and cheap web cameras to high sensitivity professional cameras and heat and IR vision cameras.

Below is provided an example of system hardware solution based on FPLD (electronic component used in digital integrated circuit production) with ARM or PowerPC core co-processor. FPLD system solution features numerous advantages with respect to similar systems, since system architecture allows a high degree of computation sequence parallelizing, thus achieving high performance and high efficiency of on-line operation as a consequence on the one hand, and use of the same FPLD physical resources in the solution due to functional similarity of certain system components on the other hand, which saves FPLD physical resources and reduces power consumption and final product cost.

Data flow management, configuration and data module switching is arranged through an integrated core, while transmission of large data volumes is carried out through static or dynamic RAM.

Modules 2, 3, 5, 6, 10, 14, 15, 16, 17, 18 may process image sequentially each time, producing the output which is defined by the limited neighborhood within the processed buffer. This allows employing a uniform streamline architecture of the modules.

Module 2 solution consists of an abstraction in front of the camera interface controller (CameraLink, GigE, UVC/USB etc.) or device simulating frame sequence reproduced from files.

Module 2 receives the frames, optionally decodes them, collects brightness and contrast statistics and transmits the updating settings back to Module 1 similarly to transmission of camera synchronization signals to Module 1.

Module 3 extracts from translation vectors for computation of updated buffer pixel prototype computation (right and left frames) and based on these loads the rectified buffers using various interpolation and averaging methods depending on the scaling factor and required performance/quality ratio. At this step, optical system distortion compensation and rectification are performed in a single operation. Computation output and meta data (time marks, sensor settings, frame statistics) are transmitted to interface module 21.

Data container 4 is located in the RAM and compactly stores pre-computed translation vectors for rectification.

Module 5 analyzes the neighborhood of each pixel in each buffer and computes the range of attributes (decade units); each attribute is generally a real number (depending on the target architecture, it can be represented as a whole with a floating or fixed point). Attribute examples include wrappers with Haar or Gabor wavelets, or Fourier expansion factors. Neighborhood size may be selected adaptively in order to provide sufficient data intensity.

Module 6 analyzes the statistics (of the current frame or, for time saving purposes, of the previous frame) of attribute distribution and selects the most data intensive and noise resistant attributes. Units (1-5) of the most essential attributes may be classified as primary, the subsequent ones may be classified as secondary. The rest may be omitted. For optimization purposes, module 6 may transmit to module 5 an order not to perform the weakest attributes in the next operation. After this module 6 performs attribute vector compressing operation. For each attribute several gradually increasing limits are selected and the given attribute is compared against these limits. The numbers of the first limits exceeding each next attribute are compressed into a bit vector and become its elements. Module 6 tends to select the limits in a way ensuring that within the entire buffer for each attribute the elements into which they are converted should contain separate value clusters and at the same time each elements should be found more or less evenly. To each compressed primary attribute vector and compressed secondary attribute vector the point of origin of these vectors is added.

Module 7 generates primary attribute tables for small non-overlapping string ranges. One table is generated for each potential value of primary attribute vector. The data from image string ranges is added to table data. Each of these tables is further re-arranged on the basis of the secondary attributes. The tables also store secondary attribute and coordinate values. Parallel table processing is possible. Module 6 design may provide for more or less the same table size.

Matching module 8 extracts sequentially data on left frame string range, e.g. strings $[n_j; n_{j+i}]$, and three (or one, subject to rectification accuracy) right frame string ranges $[n_{j-1};n_j)$, $[n_j;n_{j+1})$, $[n_{j+1};n_{j+2})$, selecting from the table the ranges corresponding to the same primary attribute range, and further compares them based on the secondary attributes using effective metrics (discrete, hamming distance, 1_1, 1_inf etc.) and a specific limit value. FPLD architecture allows efficient parallel matching without increasing the delay at this phase. Lower performance platforms may be limited to discrete accurate matching and use sorting by secondary attribute for such matching. Module 9 omits high popularity attribute vectors and performs pair selection from all exact matches based on specific heuristics, e.g. disparity minimization or a priori knowledge of the expected disparity. In the capacity of heuristics rough results of the described system operation on reduced scale images etc. may be used. The module transmits the matched coordinate pair to module 9 for hypothesis range generation.

Modules 9 and 13 are entirely identical in terms of functionality and generate hypotheses, omit attribute vectors and store only coordinate pairs; an effective output presentation for these module is a buffer containing coordinate and corresponding, e.g., to the right frame. For missing matches buffer cells are loaded with special values, while for found matches buffer cells are loaded with match coordinates.

Modules 10 and 14 are also identical; upon receipt of input match buffer these modules process it as a match hypotheses buffer and clear it of noise—unsubstantiated hypotheses. To this effect they analyze the neighborhood of each buffer element searching for matching hypotheses, and when sufficient hypothesis substantiation is found, the respective hypothesis is accepted. Module limits and settings are input by the user during system configuration.

It is worth pointing out that for Module 14 neighborhood may also be understood as time coordinate neighborhood, i.e. point motion hypotheses may be supported by the fact that a relatively non-distant point in the past was moving at a similar speed in a similar direction.

Module 11 retrieves the data from module 7 and combines the tables for all sequential string sets corresponding to the same primary attribute set into a single table. One copy of the output is transmitted to module 12, and the other copy is stored in module 21 database for use in the following frame. Parallel performance of this operation for all the tables is also possible. In the output Module 11 combines attribute data from the entire frame.

Sequence matching module is similar to module 8, yet it processes the current and previous frame data. This module is also capable of performing parallel computations, which allows its location either within a single FPLD microchip, or in multiple FPLD microchips.

Buffer improvement module attempts to assign disparity to adjacent points based on filtered hypotheses. To this effect disparity triangulation and interpolation as well as simple item-by-item search may be used. The hypothesis may be verified with the aid of cross-correlation, mutual data metrics, attribute vector matching or SAD. The latter two options are efficient in terms of computation, however, SAD requires precise brightness and contrast matching of two images, which is not always achievable.

Sequence refinement module uses the improvement module output for sub-pixel refinement of optical sequence vector value refinement with the aid of KLT or similar sub-pixel tracking method. It is worth noting that depending on the selected attributes buffer accuracy prior to this step is 1-2 pixels, i.e. the tracker must be capable of correcting such an error.

Module 19 receives bi-dimensional disparity map and attempts to identify the optimal essential or fundamental (depending on our knowledge of the camera model) matrix through robust disparity optimization. Once the essential matrix is computed, module 19 generates the rectifying transformation and transforms it into a shifting matrix which is stored in container 4.

Subject to camera mobility requirements, module 19 may run either per each frame, or in background (correction) mode. In the latter case, module 19 may run on the integrated core while it is in idle status.

The interface module allows transmission of the generated depth and sequence buffers for further processing via high quality interfaces, i.e. USB 2.0, 3.0, Ethernet, PCI-E, as well as module settings receipt.

In summary, the proposed compact stereo-approach distance and speed meter is designed for generating sequences of stereo-images and their rectification and refinement followed by attribute vector extraction from the images from each point and effective vector matching within the epitraces for stereo production—disparity between the next and previous frame for optical sequence generation, providing high distance and speed measurement speed, improved efficiency of object and gesture recognition and perimetral monitoring, preventing motor vehicle collision with other motor vehicles and static barriers, landscape, interior and object mapping, sensor application in autonomous robots and UAV (Unmanned Aerial Vehicles)—production lines etc., integration in aids for physically challenged individuals.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. An apparatus for measuring distance and speed of an object based on stereo approach, comprising:
 a video camera module configured to capture sequences of stereo images of the object, wherein the sequences of stereo images comprise previous frame data and current frame data having a left frame and a right frame; and
 an image processor configured to:
  extract at least one attribute vector from each point of the stereo images,
  rank the extracted attribute vectors as primary attribute vectors and secondary attribute vectors based on statistics data associated with the previous frame data and the current frame data;
  generate a plurality of tables containing the extracted attribute vectors and coordinates of each associated point of the stereo images, wherein each table in the plurality of tables is associated with a primary attribute vector and arranged based on at least one of the secondary attribute vectors;
  vector match within epilines for stereo disparity production using the attribute vectors stored in the tables, and
  vector match between consecutive frames for optical flow generation using the attribute vectors stored in the tables, wherein the consecutive frames includes the previous frame data and the current frame data, wherein the attribute vectors used for optical flow generation are re-used at least in part from the stereo disparity production.

2. The apparatus of claim 1, wherein the image processor performs linear data flow processing.

3. The apparatus of claim 1, further comprises a processor configured to perform real-time distance and speed measurements.

4. The apparatus of claim 1 configured to operate in a passive mode.

5. The apparatus of claim 1, wherein:
 the video camera module comprises:
  at least two video cameras capable of being focused on the object and configured to produce bi-dimensional images of the object; and
 wherein the image processor is further configured to:
  convert the video from the at least two video cameras into data structures for processing; and
  perform normalization and rectification on the images.

6. The apparatus of claim 5, wherein the image processor further comprises one or more of:
a data container updater;
an attribute extractor;
an attribute ranker;
a primary attribute reorganizer;
a primary frame matcher;
a primary hypothesis generator;
a primary hypothesis filter;
an attribute post-organizer;
a secondary attribute matcher;
a secondary hypothesis generator;
a secondary filter;
a buffer improver;
a stereo refiner;
a sequence refiner;
a triangulator;
a secondary rectifier;
a prior frame data and attribute container; and
a secondary interface.

7. The apparatus of claim 5, wherein the video cameras are optical cameras or infrared (IR) cameras.

8. The apparatus of claim 5, wherein the video cameras comprise one or more of complementary metal-oxide semiconductor (CMOS) sensors and charge-coupled device (CCD) sensors.

9. The apparatus of claim 5, further comprising a field programmable logic device (FPLD).

10. The apparatus of claim 6, wherein:
the image processor configured to generate the plurality of tables containing the extracted attribute vectors and coordinates of each associated point of the stereo images is further configured to process the plurality of tables in parallel;
the primary frame matcher is configured for parallel matching;
the attribute post-organizer is configured for parallel processing; and
the secondary attribute matcher is configured for parallel computation.

11. A method for measuring distance and speed of an object based on stereo-approach, comprising:
capturing sequences of stereo images of the object, wherein the sequences of stereo images comprise previous frame data and current frame data having a left frame and a right frame;
extracting attribute vector from each point of the stereo images;
ranking the extracted attribute vectors as primary attribute vectors and secondary attribute vectors based on statistics data associated with the previous frame data and the current frame data;
generating a plurality of tables containing the extracted attribute vectors and coordinates of each associated point of the stereo images, wherein each table in the plurality of tables is associated with a primary attribute vector and arranged based on at least one of the secondary attribute vectors;
vector matching within epilines for stereo disparity production using the attribute vectors stored in the tables; and
vector matching between consecutive frames for optical sequence generation using the attribute vectors stored in the tables, wherein the consecutive frames includes the previous frame data and the current frame data, wherein the attribute vectors used for optical flow generation are re-used at least in part from the stereo disparity production.

12. The method of claim 11, further comprising performing linear data flow processing.

13. The method of claim 11, configured for real-time application.

14. The method of claim 11, operated in a passive mode.

15. A computer system for measuring distance and speed of an object based on stereo-approach, comprising:
a processor configured to:
receive a sequence of stereo images of the object, wherein the sequences of stereo images comprise previous frame data and current frame data having a left frame and a right frame;
extract at least one attribute vector from each point of the stereo images;
rank the extracted attribute vectors as primary attribute vectors and secondary attribute vectors based on statistics data associated with the previous frame data and the current frame data;
generate a plurality of tables containing the extracted attribute vectors and coordinates of each associated point of the stereo images, wherein each table in the plurality of tables is associated with a primary attribute vector and arranged based on at least one of the secondary attribute vectors;
vector match within epilines for stereo disparity production using the attribute vectors stored in the tables; and
vector match between consecutive frames for optical sequence generation using the attribute vectors stored in the tables, wherein the consecutive frames includes the previous frame data and the current frame data, wherein the attribute vectors used for optical flow generation are re-used at least in part from the stereo disparity production.

16. The computer system of claim 15, wherein the processor further configured to perform linear data flow processing.

17. The computer system of claim 15, further comprises a processor configured to perform real-time distance and speed measurements.

18. The method of claim 11, wherein generating a plurality of tables containing the extracted attribute vectors and coordinates of each associated point of the stereo images further comprises:
generating a plurality of primary attribute tables associated with non-overlapping string ranges, wherein one primary attribute table is generated for each potential value of a primary attribute vector;
adding image string data to each table; and
re-arranging each of the primary attribute tables based on the secondary attribute vectors.

19. The method of claim 18, further comprising:
retrieving data on sequential strings of the left frame and sequential strings on the right frame;
selecting a primary attribute table corresponding to a same set of primary attributes associated with the sequential strings; and
performing secondary attribute matching using the selected primary attribute table.

* * * * *